(12) United States Patent
Kaneda et al.

(10) Patent No.: US 7,406,577 B2
(45) Date of Patent: Jul. 29, 2008

(54) DATA MIGRATION METHOD

(75) Inventors: Yasunori Kaneda, Sagamihara (JP); Yuichi Taguchi, Sagamihara (JP); Fumi Miyazaki, Kawasaki (JP); Tooru Tanaka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 325 days.

(21) Appl. No.: 11/219,649

(22) Filed: Sep. 7, 2005

(65) Prior Publication Data
US 2007/0011423 A1    Jan. 11, 2007

(30) Foreign Application Priority Data
Jul. 11, 2005    (JP) .............................. 2005-202182

(51) Int. Cl.
*G06F 12/00* (2006.01)
*G06F 12/02* (2006.01)
*G06F 13/00* (2006.01)
*G06F 13/28* (2006.01)
*G06F 9/26* (2006.01)
*G06F 9/34* (2006.01)

(52) U.S. Cl. ........................... 711/165; 711/1; 711/154; 711/203

(58) Field of Classification Search ........................ None
See application file for complete search history.

(56) References Cited

U.S. PATENT DOCUMENTS 6,457,109 B1 *  9/2002  Milillo et al. ................ 711/162
2003/0212854 A1 * 11/2003  Kitamura et al. ............ 711/112

FOREIGN PATENT DOCUMENTS

| JP | 10-508967   | 9/1998 |
| JP | 2004-220450 | 8/2004 |

* cited by examiner

*Primary Examiner*—Hyung S. Sough
*Assistant Examiner*—Gary W Cygiel
(74) *Attorney, Agent, or Firm*—Mattingly, Stanger, Malur & Brundidge, P.C.

(57) ABSTRACT

It is desirable that data stored in an old storage device is migrated to a new storage device without any interruption. According to a computer system of this invention, in a first data storage device, a second data storage area of a second data storage device is recognized as a virtualized data storage area of the first data storage device, a data copy relation between the first data storage area and the virtualized data storage area is established, the second data storage area is recognized from the computer based on the data copy relation, data is copied from the first data storage area to the virtualized data storage area based on the data copy relation, and after completion of a data copy operation, a connecting path is switched from the first data storage area to the second data storage area based on the data copy relation.

16 Claims, 15 Drawing Sheets

FIG.3A

| APPLICATION PROGRAM NUMBER (511) | PATH (512) | DATA STORAGE AREA NUMBER OF CONNECTION DESTINATION (513) |
|---|---|---|
| 15 | FIRST PATH | 101 |
| | SECOND PATH | |
| | ⋮ | |
| | nth PATH | |

FIG.3B

| APPLICATION PROGRAM NUMBER (511) | PATH (512) | DATA STORAGE AREA NUMBER OF CONNECTION DESTINATION (513) |
|---|---|---|
| 15 | FIRST PATH | 101 |
| | SECOND PATH | 201 |
| | ⋮ | |
| | nth PATH | |

FIG.3C

| APPLICATION PROGRAM NUMBER (511) | PATH (512) | DATA STORAGE AREA NUMBER OF CONNECTION DESTINATION (513) |
|---|---|---|
| 15 | FIRST PATH | 201 |
| | SECOND PATH | |
| | ⋮ | |
| | nth PATH | |

FIG.3D

| APPLICATION PROGRAM NUMBER (511) | PATH (512) | DATA STORAGE AREA NUMBER OF CONNECTION DESTINATION (513) |
|---|---|---|
| 15 | FIRST PATH | 101 |
| | SECOND PATH | 202 |
| | ⋮ | |
| | nth PATH | |

FIG.6A

| DATA STORAGE AREA NUMBER OF SOURCE OF DATA MIGRATION 5561 | VIRTUALIZED DATA STORAGE AREA NUMBER 5562 | DATA STORAGE AREA NUMBER OF DESTINATION OF DATA MIGRATION 5563 |
|---|---|---|
| 101 |  | 201 |
| : | : | : |
|  |  |  |

| DATA STORAGE AREA NUMBER OF SOURCE OF DATA MIGRATION 5561 | VIRTUALIZED DATA STORAGE AREA NUMBER 5562 | DATA STORAGE AREA NUMBER OF DESTINATION OF DATA MIGRATION 5563 |
|---|---|---|
| 101 | 102 | 201 |
| : | : | : |
|  |  |  |

| DATA STORAGE AREA NUMBER OF SOURCE 1551 | DATA STORAGE AREA NUMBER OF DESTINATION 1552 | STATUS 1553 | 155 |
|---|---|---|---|
| 101 | 102 | PAIR | |
| : | : | : | |
| | | | |

FIG.7B

| DATA STORAGE AREA NUMBER OF SOURCE 1551 | DATA STORAGE AREA NUMBER OF DESTINATION 1552 | STATUS 1553 | 155 |
|---|---|---|---|
| 101 | 102 | COPYING | |
| : | : | : | |
| | | | |

FIG10A

| SOURCE 261 | | TARGET 262 | | REWRITE BIT 263 | REWRITE TARGET 264 | |
|---|---|---|---|---|---|---|
| IP ADDRESS 2611 | PORT NUMBER 2612 | IP ADDRESS 2621 | PORT NUMBER 2622 | | IP ADDRESS 2641 | PORT NUMBER 2642 |
| 14 | 15 | 111 | 101 | 0 | | |

FIG10B

| SOURCE 261 | | TARGET 262 | | REWRITE BIT 263 | REWRITE TARGET 264 | |
|---|---|---|---|---|---|---|
| IP ADDRESS 2611 | PORT NUMBER 2612 | IP ADDRESS 2621 | PORT NUMBER 2622 | | IP ADDRESS 2641 | PORT NUMBER 2642 |
| 14 | 15 | 111 | 101 | 0 | 216 | 201 |

FIG10C

| SOURCE 261 | | TARGET 262 | | REWRITE BIT 263 | REWRITE TARGET 264 | |
|---|---|---|---|---|---|---|
| IP ADDRESS 2611 | PORT NUMBER 2612 | IP ADDRESS 2621 | PORT NUMBER 2622 | | IP ADDRESS 2641 | PORT NUMBER 2642 |
| 14 | 15 | 111 | 101 | 1 | 216 | 201 |

| 557 ↘ DATA STORAGE AREA NUMBER OF SOURCE OF DATA MIGRATION (5571) | VIRTUALIZED DATA STORAGE AREA NUMBER (5572) | DATA STORAGE AREA NUMBER OF DESTINATION OF DATA MIGRATION (5573) | VIRTUALIZED DATA STORAGE AREA NUMBER OF DESTINATION OF DATA MIGRATION (5574) |
|---|---|---|---|
| 101 | | 201 | |
| .. | | | |
| | | | |

| DATA STORAGE AREA NUMBER OF SOURCE OF DATA MIGRATION | VIRTUALIZED DATA STORAGE AREA NUMBER | DATA STORAGE AREA NUMBER OF DESTINATION OF DATA MIGRATION | VIRTUALIZED DATA STORAGE AREA NUMBER OF DESTINATION OF DATA MIGRATION |
|---|---|---|---|
| 101 | 102 | 201 | |
| | | .. | |
| | | | |

5571     5572     5573     5574

557

| DATA STORAGE AREA NUMBER OF SOURCE OF DATA MIGRATION | VIRTUALIZED DATA STORAGE AREA NUMBER | DATA STORAGE AREA NUMBER OF DESTINATION OF DATA MIGRATION | VIRTUALIZED DATA STORAGE AREA NUMBER OF DESTINATION OF DATA MIGRATION |
|---|---|---|---|
| 101 | 102 | 201 | 202 |
| | | .. | |
| | | | |

FIG. 12C

DATA MIGRATION METHOD

CROSS-REFERENCE TO PRIOR APPLICATION

This application relates to and claims priority from Japanese Patent Application No. 2005-202182 filed on Jul. 11, 2005 the entire disclosure of which is incorporated herein by reference.

BACKGROUND

This invention relates to a computer system including a plurality of data storage systems and computers, and more particularly to data migration in a virtualized environment, where a data storage system is virtualized.

Computers store data in the data storage system. When a retention period of the data is longer than the life of the data storage system, it is required to migrate the data stored in an old data storage system to a new storage system before the device reaches its life. Upon the data migration, it is desirable that an unavailable time period be as short as possible, in which the computer cannot use the storage system, and furthermore, migration be conducted without any interruption.

As for a technique to migrate data from an old data storage system to a new one, for example, JP 10-508967 A and JP 2004-220450 A are disclosed. According to JP 10-508967 A and JP 2004-220450 A, before the start of data migration from an old data storage system to a new one, the computer is once disconnected and reconnected to a new data storage system.

Moreover, according to JP 2004-220450 A, in the new data storage system, a virtualized device (data storage area) corresponding to the device in the old data storage system is provided. By accessing to the virtualized device, the computer can access the device in the old data storage system corresponding to the virtualized device.

SUMMARY

According to the techniques described in JP 10-508967 A and JP 2004-220450 A, prior to data migration, the computer is required to be disconnected and reconnected to a new data storage system. During the above disconnecting and reconnecting operations, the access temporarily stops from the computer to the data storage system. Further, even if there is room until the device reaches its life, after the completion of data migration, the old data storage system is no longer available.

It is therefore an object of this invention to provide a computer system, including: a computer; and a plurality of data storage systems connected to the computer and including a first data storage system and a second data storage system, wherein: the first data storage system includes: a virtualized data storage area management module; a data copy management module; and a first data storage area for storing data written by the computer; the second data storage system includes a second data storage area, into which data stored in the first data storage area migrates; the virtualized data storage area management module creates a virtualized data storage area corresponding to the second data storage area in the first data storage system; the virtualized data storage area management module converts a write request for data issued to the virtualized data storage area into a write request to the second data storage area and issues the write request; the data copy management module issues a write request for copying the data stored in the first data storage area into the virtualized data storage area; the computer includes a path switching module; and the path switching module switches an object, to which the computer issues a data write request, from the first data storage area to the second data storage area after completion of a copy operation.

According to an embodiment of this invention, the change of configuration can be easily performed during the operation of the computer system including the data storage systems and the computers connected to each storage system via networks.

BRIEF DESCRIPTION OF THE DRAWINGS

FIGS. 3A to 3D are each an explanatory diagram of path information according to the first embodiment of this invention.

FIGS. 6A and 6B are each an explanatory diagram of a management table stored in a management computer according to the first embodiment of this invention.

FIGS. 7A and 7B are each an explanatory diagram of a management table stored in a data storage system according to the first embodiment of this invention.

FIGS. 10A to 10C are each an explanatory diagram of path information according to the second embodiment of this invention.

FIGS. 12A to 12C are each an explanatory diagram of a management table stored in a management computer according to the third embodiment of this invention.

DESCRIPTION OF THE PREFERRED EMBODIMENTS

Figure 1:
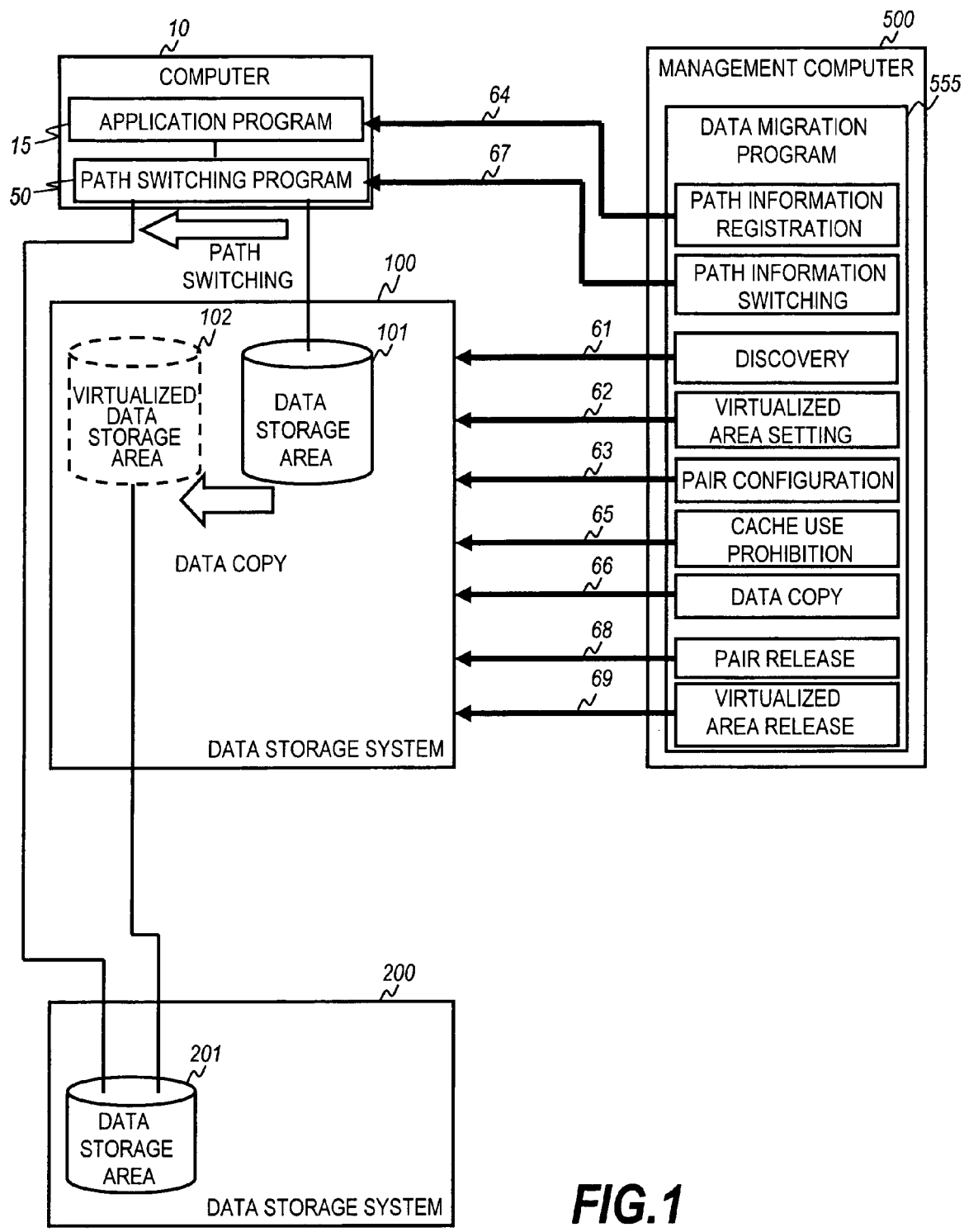
FIG. 1 is an explanatory diagram of an outline of a first embodiment of this invention.

Hereinafter, embodiments of this invention will be explained while referring to the drawings.

First, an outline of a first embodiment will be explained.

FIG. 1 is an explanatory diagram of the outline of the first embodiment of this invention.

Detailed configuration of a computer system according to this embodiment will be explained later while referring to FIG. 2.

Referring to FIG. 1, a computer 10 according to this embodiment is connected to a data storage system 100. An application program 15 on the computer 10 uses a data storage area 101 of the data storage system 100. In other words, the application program 15 writes data into the data storage area 101, and read out the written data. The computer 10 holds a path switching program 50.

The path switching program 50 is a program for switching a data storage area for a target of a data read write request issued by the application program 15. Herein, a path is a route of the read write request which extends from the computer 10 to any data storage area. The path switching program 50 sets a target data storage area of the read write request by setting path information (to be described later). The path switching program 50 shown in FIG. 1 is initially set to issue a request to the data storage area 101.

The computer system according to this embodiment further includes a data storage system 200. When the device life of the data storage system 100 is about to expire, data in the data storage area 101 are moved (migration) into a data storage area 201 of the new data storage system 200. The introduction of the data storage system 200 and a physical connection of the data storage system 200 to the data storage system 100 are manually performed by an operator. After that, the procedure of data migration is automatically conducted by a management computer 500. The management computer 500 stores a data migration program 555 to execute the migration of data.

The data migration program 555 first gives the data storage system 100 an instruction to make a discovery of the data storage area of the data storage system 200 (61).

Then, the data migration program 555 gives the data storage system 100 an instruction to set the discovered data storage area 201 as a virtualized data storage area 102 of the data storage system 100 (62). The virtualized data storage area 102 is a virtualized area which is related to the data storage area 201 where data are actually stored. In other words, data are not stored in the virtualized data storage area 102 itself. When a data write request is issued to the virtualized data storage area 102, requested data are actually stored in the data storage area 201.

Next, the data migration program 555 sets the data storage area 101 and the virtualized data storage area 102 as a pair (63). The pair means a set of two data storage areas, where data copy is conducted, and one of the two data storage areas is a source and the other one is a destination. In the example of FIG. 1, the data storage area 101 is the source, and the virtualized data storage area 102 is the destination. When the copy operation is conducted in the pair, data stored in the data storage area 101 is copied to the virtualized data storage area 102. The data is actually stored in the data storage area 201. The data migration program 555 registers the data storage area 201 in path information of the path switching program 50 (64).

Next, the data migration program 555 gives the data storage system 100 an instruction to prohibit the use of the cache with regard to the data storage area 101 of the data storage system 100 (65).

Then, the data migration program 555 gives the data storage system 100 an instruction to copy the data in the data storage area 101 to the virtualized data storage area 102 (66).

When the copy operation is completed, the data migration program 555 sets the path information of the path switching program 50 in such a way that the request from the application program is switched to be issued to the data storage area 201 (67).

After the completion of the switching, the data migration program 555 releases the pair configuration between the data storage area 101 and the virtualized data storage area 102 (68), and further, releases the correspondence of the data storage area 201 to the virtualized data storage area 102 (69).

By conducting the above mentioned procedure, the data migration from the data storage area 101 to the data storage area 201 can be conducted without interrupting the reception of the request from the computer 10. This is realized by the fact that the connection between the virtualized data storage area 102 and the data storage area 201 can be established independent of the connection between the computer 10 and the data storage area 101, the data copy from the data storage area 101 to the virtualized data storage area 102 can be executed while receiving the request from the computer 10, and the path switching from the data storage area 101 to the data storage area 201 can be executed in response to each request from the application program 15.

Hereinafter, detailed explanations will be given to this invention.

Next, the configuration of the computer system according to this embodiment will be explained.

Figure 2:
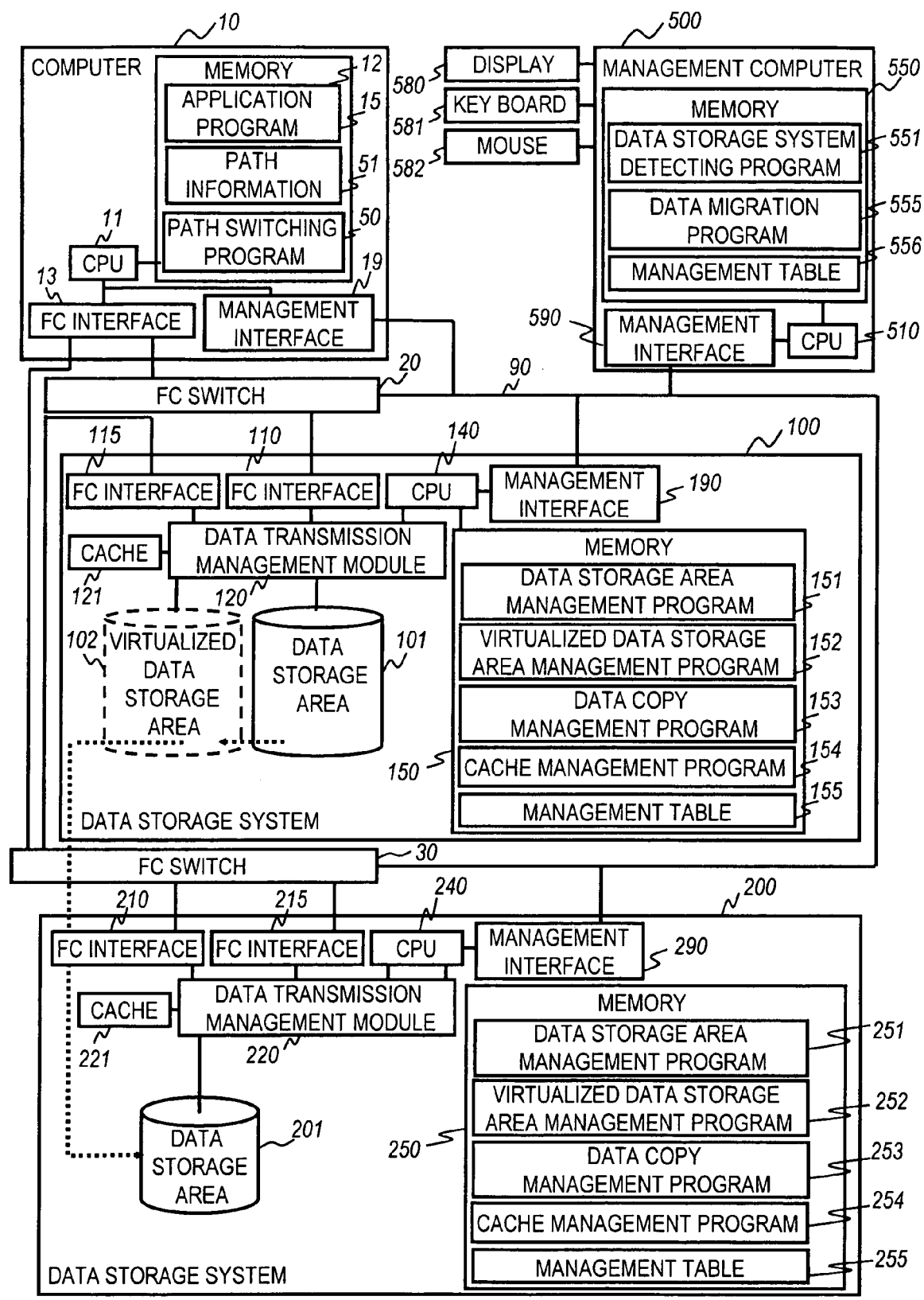
FIG. 2 is a block diagram illustrating a configuration of a computer system according to the first embodiment of this invention.

FIG. 2 is a block diagram illustrating the configuration of the computer system according to the first embodiment of this invention.

Explanations will be omitted regarding parts already explained in FIG. 1.

The computer system shown in FIG. 2 includes the computer 10, the data storage system 100, the data storage system 200, and the management computer 500. The data storage system 100 is an old storage system, whose device life is about to expire, and stores the data storage area 101, which is used by the computer 10. The data storage system 200 is a new data storage system, which replaces the data storage system 100 to allow the computer 10 to newly begins to use the data storage system 200. The management computer 500 is a computer to manage the operation of the computer system of FIG. 2.

The computer 10 and the data storage system 100 are connected by a fibre channel. More specifically, a fibre channel interface 13 (hereinafter, abbreviated as an "FC interface") of the computer 10 is connected to an FC interface 110 of the data storage system 100 via a fibre channel switch 20 (hereinafter, abbreviated as an "FC switch"). On the other hand, the data storage system 100 and 200 are connected by the fibre channel via an FC switch 30. The FC switch 30 according to this embodiment composes a network which interconnects the computer 10, the data storage system 100, and the like. This invention is not limited by kinds of the network, and therefore, a network using the Internet protocol may be used instead of the fibre channel.

Next, explanations will be given to the computer 10.

The computer 10 includes a CPU 11, a memory 12, an FC interface 13, and a management interface 19.

The CPU 11 is a processor for executing the program held in the memory 12.

The memory 12 stores a program, which is executed by the CPU 11, and data. The memory 12 according to this embodiment stores an application program 15, a path switching program 50, and a path information 51.

The application program 15 executes data processing by issuing data read write requests to data storage systems.

The path switching program 50 finally decides which data storage area of which data storage system the application 15 issues the read write request to.

As shown in FIGS. 3A to 3D, the path information 51 is a table for setting the target data storage area of the read write command issued by the application program 15.

The FC interface 13 is connected to the data storage systems 100 and 200 via the FC switches 20 and 30. The computer 10 exchanges read write requests and data with each data storage system via the FC interface 13.

The management interface 19 is connected to the management computer 500 via the management network 90.

Next, explanations will be given to a data storage system 100.

The data storage system 100 includes FC interfaces 110 and 115, a data transmission management module 120, a cache 121, a CPU 140, a memory 150, a management interface 190, and a data storage area 101. The data storage system 100 may further include the virtualized data storage area 102.

The FC interface 110 is connected to the computer 10 via the FC switch 20.

The FC interface 115 is connected to other storage systems (in the example of FIG. 2, the data storage system 200) via the FC switch 30.

The data transmission management module 120 manages the data transmission between the data storage area 101 and the virtualized data storage area 102, and the FC interface 110 and the like.

The cache 121 temporarily holds the data received from the computer 10 and the data read from the data storage area 101 and the like.

The CPU 140 executes the program stored in the memory 150 to perform the processing of the request accepted from the computer 10, data copy, and the management of the data storage area 101 and the like.

In the memory 150, programs executed by the CPU 140 and tables necessary for executing those programs are stored. Specifically, the memory 150 stores a data storage area management program 151, a virtualized data storage area management program 152, a data copy management program 153, a cache management program 154, and a management table 155. Those programs are executed for managing read write requests form the computer 10 and the management of the data storage area 101 and the like by the management computer 500 (described later).

The management table 155 is used for managing the data copy executed in the data storage system 100.

The management interface 190 is connected to the management computer 500 via the management network 90.

The data storage area 101 is an area for storing the data used by the computer 10. For example, the data storage system 100 includes one or more hard disk drives (not shown), on which the data storage area 101 is set. The computer 10 recognizes a single data storage area 101 as a single hard disk drive.

The computer system according to this embodiment initially includes a single data storage system 100 having a single data storage area 101 used by the computer 10. However, this invention can be applicable to a computer system in which any number of computers include any number of data storage areas.

Since the configuration of the data storage system 200 is similar to that of the data storage system 100, detailed explanations will be omitted.

FC interfaces 210 and 215, a data transmission management module 220, a cache 221, a CPU 240, a memory 250, and a management interface 290 of the data storage system 200 are the same as the FC interfaces 110 and 115, the data transmission management module 120, the cache 121, the CPU 140, the memory 150, and the management interface 190, respectively.

The memory 250 stores a data storage area management program 251, a virtualized data storage area management program 252, a data copy management program 253, a cache management program 254, and a management table 255, which correspond to the data storage area management program 151, the virtualized data storage area management program 152, the data copy management program 153, the cache management program 154, and the management table 155 stored in the memory 150, respectively.

Next, explanations will be given to the management computer 500.

The management computer 500 includes a CPU 510, a memory 550, and a management interface 590.

The CPU 510 executes the program stored in the memory 550.

The memory 550 stores programs executed by the CPU 510 and tables required for executing those programs. Specifically, the memory 550 stores a data storage system detecting program 551, a data migration program 555, and a management table 556.

As shown in FIGS. 6A and 6B, the management table 556 is used for managing the data migration performed in the data storage system 100 or the like.

Moreover, the management computer 500 is connected to a display 580 for presenting an administrator with necessary information, a keyboard 581 and a mouse 582 for accepting the input from the administrator.

Next, explanations will be given to the path information 51.

FIGS. 3A to 3D are each an explanatory diagram of the path information 51 according to the first embodiment of this invention.

FIGS. 3A to 3D show the path information 51 of this embodiment at each time point. Explanations thereof will be given later.

The path information 51 according to this embodiment includes an application program number 511, a path 512, and a data storage area number of the connection destination 513.

The application program number 511 is a number of an application program whose read write command target is set based on the path information 51. In the example of FIGS. 3A to 3D, the read write command target of the application program 15 is set.

A path 512 represents a priority of a path to be set. A first path represents a path that is currently set. A second path represents a path to be set next to the first path. An nth path represents a path to be set next to the (n−1)th path (n is an arbitrary natural number).

The data storage area number of the connection destination 513 is a number (identifier) of the data storage area of the connection destination of the path to be set. In the example of FIG. 3A, "101" is set as the data storage area number 513 of the connection destination corresponding to the first path. In this case, a read write request is issued by the computer 10 to the data storage area 101.

Next, explanations will be given to a confirmation screen.

Figure 4:
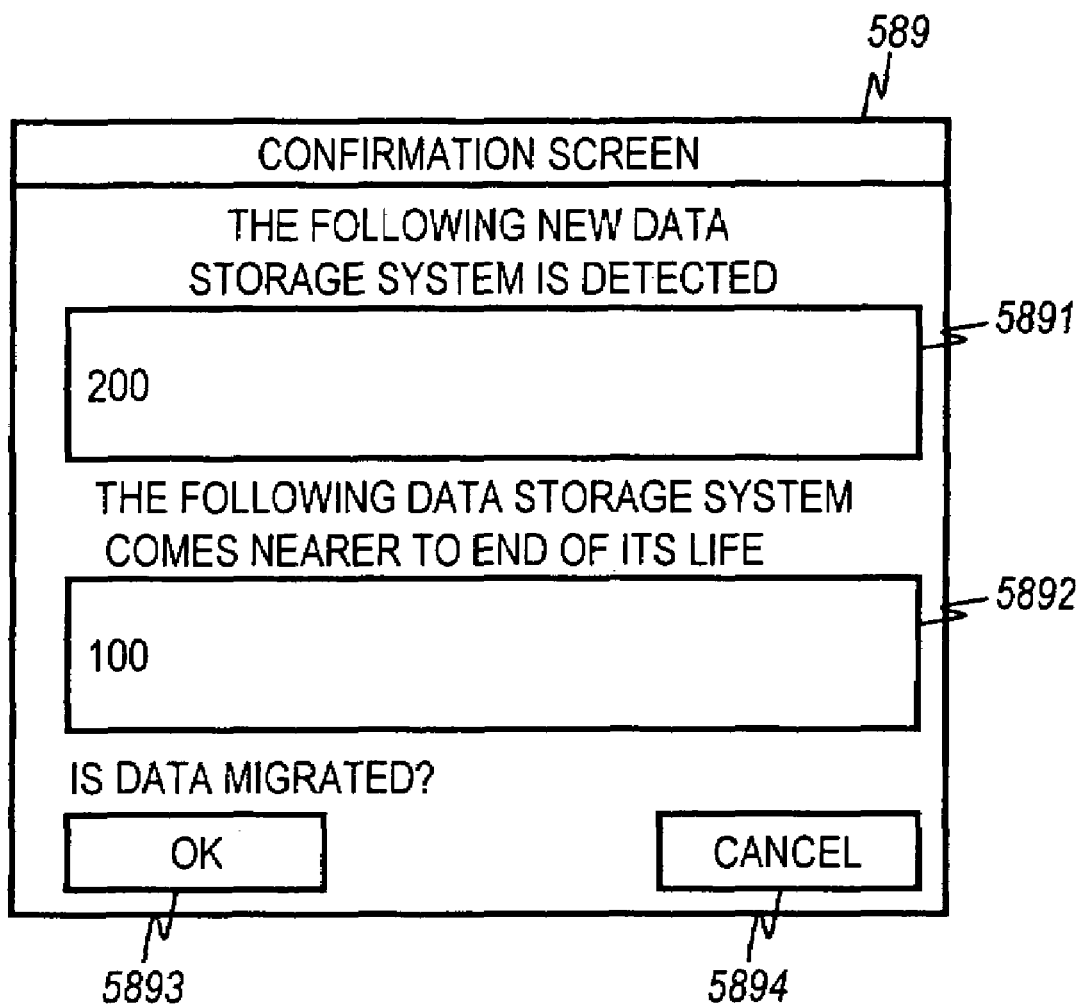
FIG. 4 is an explanatory diagram of a confirmation screen displayed on a display according to the first embodiment of this invention.

FIG. 4 is an explanatory diagram of a confirmation screen displayed on a display 580 according to the first embodiment of this invention.

A confirmation screen 589 according to this embodiment includes a new data storage system displaying field 5891, an old data storage system displaying field 5892, an execution button 5893, and a cancellation button 5894.

Displayed on the new data storage system displaying field 5891 is information on the new data storage system discovered according to the instruction of the discovery (61).

On the other hand, displayed on the old data storage system displaying field 5892 is information on the old data storage system whose device life is about to expire.

In the example of FIG. 4, "200" is displayed on the new data storage system displaying field 5891, while "100" is displayed on the old data storage system displaying field 5892. This represents that the device life of the data storage system 100 is about to expire, while the data storage system 200 is newly connected to the computer system and discovered according to the instruction of the discovery.

The execution button 5893 ("OK" in FIG. 4) is operated (for example, clicked with the mouse 582) when a system administrator executes data migration. In the example of FIG. 4, the system administrator operates the execution button to start data migration from the data storage system 100 to the data storage system 200.

The cancellation button 5894 ("CANCEL" in FIG. 4) is operated when the system administrator cancels the execution of data migration.

Next, explanations will be given to a data storage area list.

Figure 5:
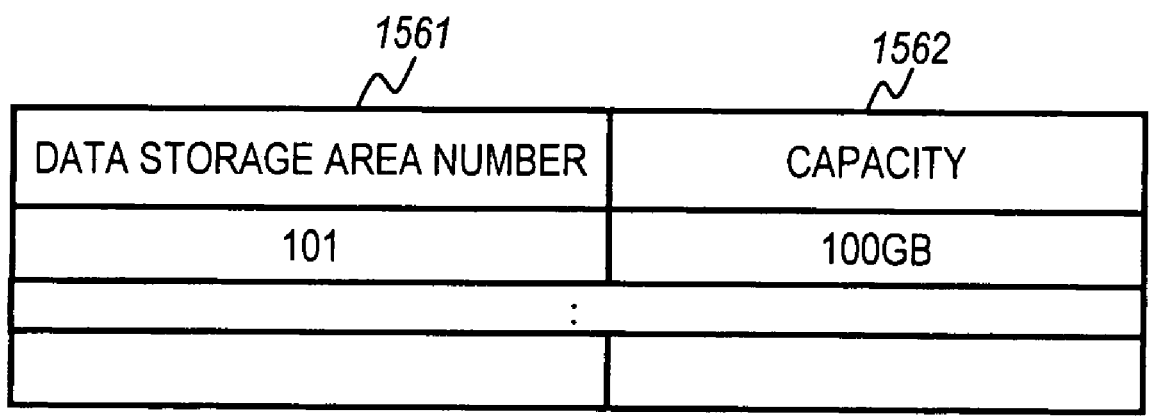
FIG. 5 is an explanatory diagram of a data storage area list according to the first embodiment of this invention.

FIG. 5 is an explanatory diagram of the data storage area list according to the first embodiment of this invention.

The data storage area list is created when the data storage area management program 151 of the data storage system 100 (or, the data storage area management program 251 of the data storage system 200) receives the request from the management computer 500, and includes information to be returned to the management computer 500 (described later).

The data storage area list includes information with regard to the data storage area 101 and the like, which is set in the data storage system 100 and the like at the time of creation. The data storage area list according to this embodiment includes a data storage area number 1561 for identifying the data storage area 101 and the like, and a storage capacity 1562, which represents the storage capacity of the data storage area 101 and the like.

FIG. 5 shows an example of the data storage area list to which the data storage area management program 151 of the data storage system 100 responds. In the example of FIG. 5, the data storage area number 1561 is "101", and the storage capacity 1562 is "100 GB". This represents that the data storage area 101 is set in the data storage system 100, and its storage capacity is 100 GB (gigabytes).

Next, explanations will given to the management table 556.

FIGS. 6A and 6B are each an explanatory diagram of the management table 556 stored in the management computer 500 according to the first embodiment of this invention.

The management table 556 is a table for managing the data migration executed in the computer system according to this embodiment.

FIGS. 6A and 6B show management tables 556 of this embodiment at each time point. Explanations thereof will be given later.

The management table 556 includes a data storage area number of a data migration source 5561, a virtualized data storage area number 5562, and a data storage area number of a data migration destination 5563. In those fields, data storage area numbers (identifiers) are registered for identifying any one of data storage areas and virtualized data storage areas.

Herein, the data storage area number of the data storage area 101, the virtualized data storage area 102, and the data storage area 201 are "101", "102", and "201", respectively.

In the example of FIG. 6A, the data storage area number of a data migration source 5561 is "101", the data storage area number of a data migration destination 5563 being "201". This represents that data in the data storage area 101 is set to be migrated to the data storage area "201".

In the example of FIG. 6B, the data storage area number of a data migration source 5561 is "101", the virtualized data storage area number 5562 is "102", and the data storage area number of a data migration destination 5563 is "201". In other words, as shown in FIG. 1, the virtualized data storage area 102 corresponding to the data storage area 201 is set, data in the data storage area 101 is copied to the virtualized data storage area 102, and therefore the data is migrated to the data storage area 201.

Next, explanations will be given to the management table 155.

FIGS. 7A and 7B are each an explanatory diagram of the management table 155 stored in the data storage system 100 according to the first embodiment of this invention.

The management table 155 is a table for managing the pair status of the data storage area in the data storage system 100.

FIGS. 7A and 7B show the management tables 155 of this embodiment at each time point. Explanations thereof will be given later.

The management table 155 includes a data storage area number of a copy source 1551, a data storage area number of a copy destination 1552, and a status 1553.

The data storage area numbers of a copy source 1551 and the data storage area number of a copy destination 1552 are numbers (identifiers) of the data storage area (or virtualized data storage area) of a source and a destination of data copy to be performed, respectively. In the example of FIGS. 7A and 7B, the data storage area 101 is a copy source and the virtualized data storage area 102 is a copy destination. In other words, as shown in FIG. 1, the data storage area 101 and the virtualized data storage area 102 form a pair.

A status 1553 represents the status of the pair. In the example of FIG. 7A, the status 1553 is a "pair". This represents that a pair is created in the data storage area 101 and the virtualized data storage area 102. On the other hand, in the example of FIG. 7B, the status 1553 is "copying". This represents that data copy is performed from the data storage area 101 to the virtualized data storage area 102.

It should be noted that the management table 255 is stored in the data storage system 200. Since the configuration of the management table 255 is the same as that of the management table 155, explanations will be omitted. However, in the management table 255, information on the pair in the data storage system 200 is registered.

Next, explanations will be given to the initial condition.

The computer system according to this embodiment initially includes the computer 10, the FC switch 20, the data storage system 100, and the management computer 500. In other words, the application program 15 of the computer 10 uses the data storage area 101 of the data storage system 100. As shown in FIG. 3A, the path information 51 sets the data storage area number "101" of the connection destination as the first path. The path switching program 50 refers to the path information 51 whenever receiving a read write request from the application program 15, and issues a read write request to the data storage area 101 of the connection destination. As a result, the application program 15 issues the read write request to the data storage area 101 via the FC interface 13.

Next, explanations will given to the device life of the data storage system 100 and installation of the data storage system 200.

Herein, it is assumed that the data storage system 100 comes close to the end of its device life, so data is migrated to a new storage system 200. The system administrator or the like installs the data storage system 200 and via the FC switch 30, connects the FC interface 125 of the data storage system 100 to the FC interface 210. Moreover, the system administrator or the like connects the management interface 290 of the data storage system 200 to the management network 90.

Next, explanations will be given to the detection of the data storage system 200 in the management computer 500.

The data storage system detecting program 551 of the management computer 500 regularly searches for the management network 90 to confirm the remaining hours of operation (in other words, the time to the end of the device life) of the data storage system connected thereto and whether a new data storage system is connected or not. In this embodiment, when a data storage system 200 is newly discovered, the data storage system detecting program 551, for example, displays the confirmation screen 589, which is shown in FIG. 4, on the display 580. As a result, the system administrator is notified that a new data storage system 200 is added, and the data storage system 100 comes close to the end of its device life.

The system administrator can decide whether data migration should be executed or not, while referring to the confirmation screen 589 and by operating the keyboard 581 or the mouse 582. Hereinafter, explanations will be given while referring to the flow chart in FIG. 8 about the case when the execution button 5893 is operated on the confirmation screen 589 (in other words, the system administrator decides to perform data migration).

Figure 8:
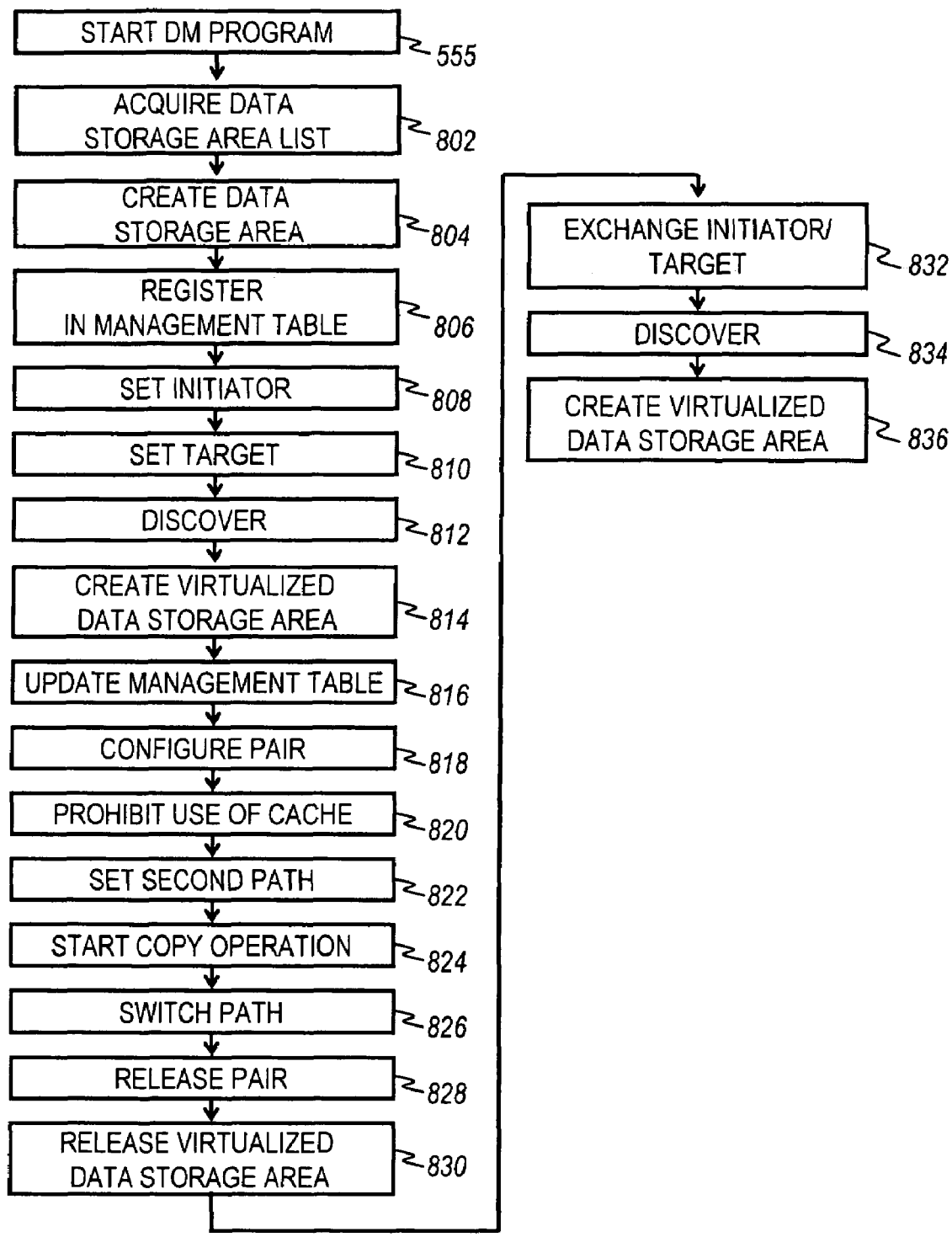
FIG. 8 is a flow chart illustrating a procedure of data migration executed by a data migration program according to the first embodiment of this invention.

FIG. 8 is a flow chart illustrating the procedure of the data migration executed by the data migration program 555 according to the first embodiment of this invention.

When the execution button 5893 is operated on the confirmation screen 589, the management computer 500 executes the data migration program 555 (hereinafter, referred to as "DM program 555"). Hereinafter, the process executed by the DM program 555 will be explained with referring to the flow chart in FIG. 8.

The DM program 555 first obtains the data storage area list from the data storage system 100 (802). In this embodiment, the DM program 555 requires the data storage area list to the data storage area management program 151 of the data storage system 100. The data storage area management program 151 responds to the request with the data storage area list shown in FIG. 5.

Next, the DM program 555 gives the data storage system 200 an instruction to create a data storage area, which corresponds to the storage capacity of the data storage area 101, as the destination of data migration of the data storage area 101 (804). As shown in the data storage area list of FIG. 5, the storage capacity of the data storage area 101 is "100 GB". Therefore, the DM program 555 gives the data storage area management program 251 of the data storage system 200 an instruction to create a data storage area of 100 GB. As shown in FIG. 2, the data storage area management program 251 creates the data storage area 201. The data storage area management program 251 notifies the DM program 555 that the data storage area 201 has been created.

Next, the DM program 555 registers in the management table 556 that the data storage area 201 corresponding to the data storage area 101 has been created (806). FIG. 6A shows the content of the management table 556 at this time. In other words, corresponding to the data storage area number "101" of the data storage area 101 registered in the data storage area number of the data migration source 5561, the data storage area number "201" of the data storage area 201 is registered in the data storage area number of the data migration destination 5563.

Next, the DM program 555 sets the FC interface 115 of the data storage system 100 as an initiator (808). As a result, the data storage system 100 becomes ready to issue read write request via the FC interface 115 to the data storage system 200.

Then, the DM program 555 sets the FC interface 210 of the data storage system 200 as a target (810). As a result, the data storage system 200 becomes ready to receive read write request via the FC interface 210 from the data storage system 100.

Next, the DM program 555 gives the virtualized data storage area management program 152 an instruction to discover the data storage area via the FC interface 115, which is set as the initiator (812). Herein, the data storage area 201 is discovered. The virtualized data storage area management program 152 notifies the DM program 555 that the data storage area 201 has been discovered.

Then, the DM program 555 gives the virtualized data storage area management program 152 an instruction to create a virtualized data storage area corresponding to the data storage area 201 (814). As shown in FIG. 2, the virtualized data storage area management program 152 creates the virtualized data storage area 102. The virtualized data storage area management program 152 notifies the DM program 555 that the virtualized data storage area 102 corresponding to the data storage area 201 has been created.

Next, The DM program 555 updates the management table 556 (816). Specifically, the DM program 555 registers the virtualized data storage area 102 corresponding to the data storage area 201 in the management table 556. FIG. 6B shows the updated content of the management table 556. The read write request (including the request issued at the time of data copy operation) to the virtualized data storage area 102 is issued via the FC interface 115, which is set as the initiator, to the data storage area 201 of the data storage system 200. In other words, the read write request to the virtualized data storage area 102 is actually converted into the read write request to the data storage area 201 and reissued. As a result, in response to the write request to the virtualized data storage area 102, data is written into the data storage area 201, and in response to the read request to the virtualized data storage area 102, data is read out from the data storage area 201.

Next, while referring to the data storage area number registered in the management table 556, the DM program 555 gives the data copy management program 153 an instruction to configure a pair, in which the data storage area 101 is the source of data copy and the virtualized data storage area 102 is the destination of data copy (818). With the pair configuration, data copy becomes ready for execution. The data copy management program 153 registers the pair configuration in the management table 155. Moreover, the data copy management program 153 manages the status of the configured pair by using the management table 155. FIG. 7A shows the content of the management table 155 immediately after the execution of step 818.

Then, the DM program 555 gives the cache management program 154 an instruction to prohibit the use of the cache 121 regarding the data storage area 101 (820). The cache management program 154 writes all the remaining data in the cache 121 regarding the data storage area 101 into the data storage area 101, and enables a setting to prohibit the use of the cache 121 after that.

When there is data received from the computer in the cache 121 and the data has not been written into the data storage area 101 yet, data in the data storage area of the data storage system 100 and that of the data storage system 200 do not completely coincide. When switching a path after the completion of the copy operation, it is required that data in different data storage areas coincide. Thus, in step 820, the use of cache 121 is prohibited. When using the cache 121 is prohibited, the response time to the computer becomes longer, so the use of the cache 121 may be prohibited after the completion of copy operation and immediately before switching the path.

Then, the DM program 555 gives the path switching program 50 of the computer 10 an instruction to register the data storage area 201 as the second path related to the data storage area 101 (822). As a result, as shown in FIG. 3B, the path information 51 is updated.

Next, the DM program 555 gives the data copy management program 153 an instruction to start copy operation (824). The data copy management program 153 starts copy operation from the data storage area 101 to the virtualized data storage area 102. Then, as shown in FIG. 7B, the data copy management program 153 rewrites the status 1553 corresponding to the pair of the data storage area 101 and the virtualized data storage area 102 in the management table 155 as "copying".

The data copy means that the data transmission management module 120 sequentially reads from the first block to the final block of the data storage area (in this embodiment, the data storage area 101), which is a source, and writes them into the block at the same position in the data storage area (in this embodiment, the virtualized data storage area 102), which is a destination. When receiving a data write request from the computer 10 during the data copy operation, the data transmission management module 120 may write the data into both the data storage area 101, which is a source, and the virtualized data storage area 102, which is a destination. Alternatively, the data transmission management module 120 may write data only to the data storage area 101, which is the source, memorizes the location of the block, where data is written, and after copying up to the final block, the memorized data on the location of the block can be copied again.

In this embodiment, the destination is the virtualized data storage area 102. Thus, when data is written into the virtualized data storage area 102 in the copy operation, the virtualized data storage area management program takes the write operation as a write request for the data storage area 201 to issues the write request via the FC interface 115.

Upon the completion of the copy operation, the data copy management program 153 notifies the DM program to that effect.

Next, the DM program 555 gives the path switching program 50 of the computer 10 an instruction to set the data storage area 201 as the first path for the path information 51 (826). As shown in FIG. 3C, the path switch program 50 updates the path information 51. After the path information 51 is updated, the read write request issued by the application program 15 is issued by the path switching program 50 to the new data storage area 201, where data migration is completed. When the update of the path information 51 is completed, the path switching program 50 notifies the DM program 555 to that effect.

Next, the DM program 555 gives the data copy management program 153 an instruction to release the pair relation between the data storage area 101 and the virtualized data storage area 201 (828). Moreover, the DM program 555 gives the virtualized data storage management program 152 an instruction to release the correspondence between the data storage area 201 and virtualized data storage area 102 (830).

According to the first embodiment, data migration from the data storage area 101 to the data storage area 201 can be conducted without interrupting the receipt of read write requests from the computer 10. This is realized by the fact that: the connection between the virtualized data storage area 102 and data storage area 201 can be established independent of the connection between the computer 10 and data storage area 101, the data copy operation from the data storage area 101 to the virtualized data storage area 102 can be executed while receiving requests from the computer 10, and the path switching from the data storage area 101 to the data storage area 201 can be executed in response to each request.

After the completion of the above procedures, the DM program 555 may set the FC interface 210 as the initiator and the FC interface 215 as the target (832).

Then, the DM program 555 may give the virtualized data storage area management program 252 of the data storage system 200 an instruction to discover a data storage area via the FC interface 210, which is set as the initiator (834). In the configuration of FIG. 2, the data storage area 101 is discovered.

Next, the DM program 555 may give the virtualized data storage area management program 252 an instruction to create a virtualized data storage area (not shown) corresponding to the data storage area 101 (836). As a result, the computer 10 can reuse the data storage area 101 via the data storage system 200. Thus, after the completion of data migration, even the data storage system whose device life is about to expire, can continue to be used almost until the end of device life, and therefore, the data storage area can be effectively used. It is desirable that the use of such a data storage area be used temporarily.

Next, a second embodiment of this invention will be explained.

Figure 9:
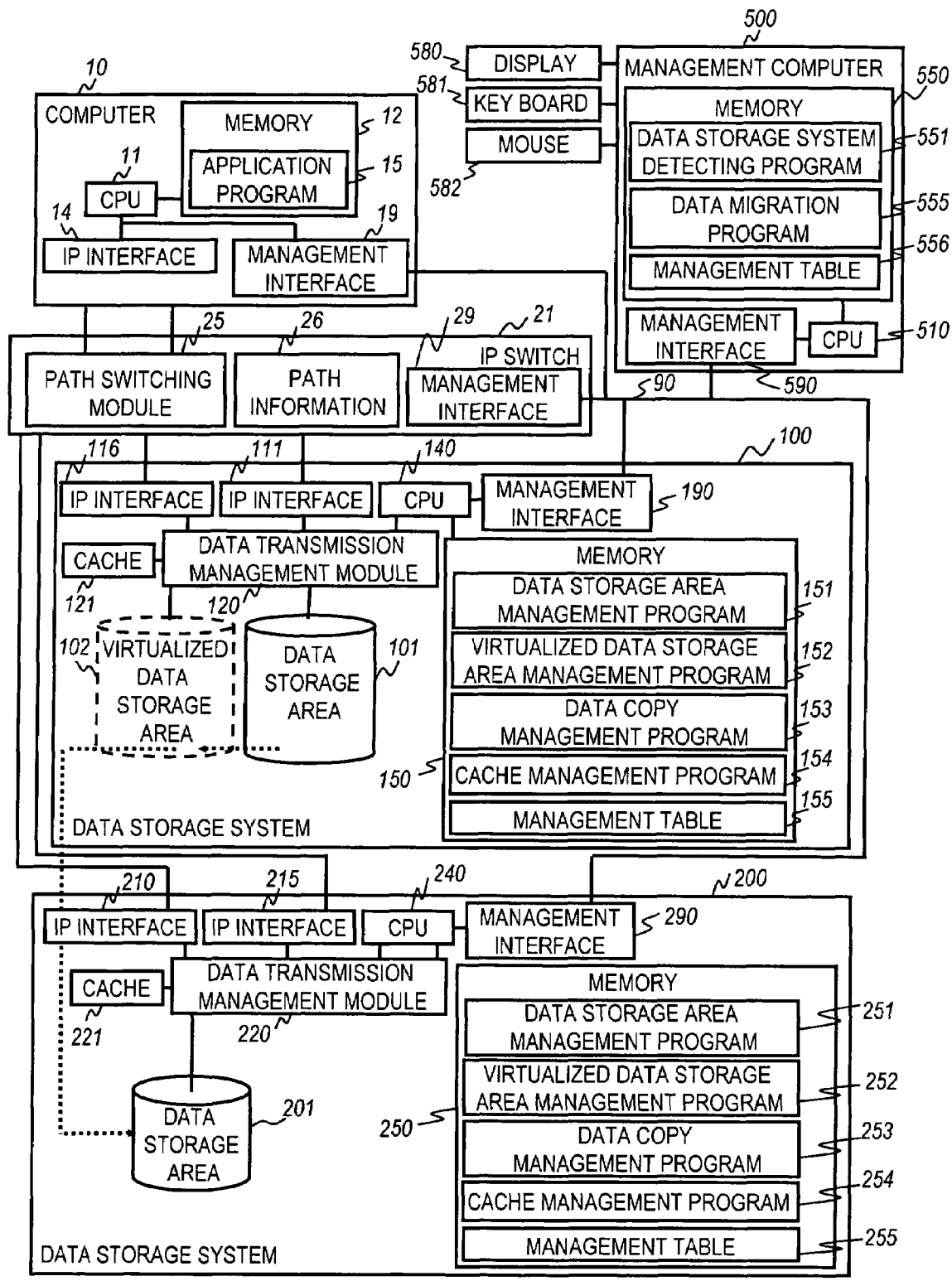
FIG. 9 is a block diagram illustrating a configuration of a computer system according to a second embodiment of this invention.

In a second embodiment, as shown in FIG. 9 (described later), instead of the fibre channel of the first embodiment, a network based on the Internet protocol connects the computer 10 and the data storage systems 100 and 200. For compatibility with the Internet protocol, an IP switch 21 is employed instead of the FC switch 20 and the like in the first embodiment, and an IP interface 14 and the like being employed instead of the FC interface 13 and the like. Further, in the first embodiment, the path switching program 50 of the computer 10 switches the target data storage area for the read write request issued by the application program 15, while in the second embodiment, the IP switch realizes the switching.

First, explanations will be given to the computer system according to this embodiment.

FIG. 9 is a block diagram illustrating the configuration of the computer system according to the second embodiment of this invention.

The computer system according to this embodiment includes a single IP switch 21 instead of the two FC switches 20 and 30 in the computer system (FIG. 2) of the first embodiment. The computer system according to this embodiment further includes IP interfaces 14, 111, 116, 211, and 216 instead of the FC interfaces 13, 110, 115, 210, and 215. Furthermore, the computer 10 according to this embodiment does not hold the path switching program 50 and the path information 51.

The other parts are the same as those of the first embodiment (FIG. 2), so explanations thereof will be omitted.

Next, explanations will be given to the IP switch 21.

The path switching according to this embodiment is conducted by a path switching module 25 included in the IP switch 21. The path switching module 25 analyzes a packet including read write requests received from the computer 10 and by rewriting the packet according to the path information 26, switches the target of the packet. The source and target of the packet are identified by the identifier of the IP interface, such as an IP address and a port number. In the explanation below, for the sake of simplicity, the source and target of the packet are identified by using numbers represented in the drawing. Specifically, in the following explanation, numbers (14, 111, and so on), assigned to the IP interface are employed instead of the IP address, and a number (15) assigned to the application program or numbers (101 and so on) assigned to the data storage area are employed instead of the port number.

Next, explanations will be given to the path information 26.

FIGS. 10A to 10C are each an explanatory diagram illustrating the path information 26 according to the second embodiment of this invention.

FIGS. 10A to 10C show the path information 26 at each time point according to this embodiment. Explanations thereof will be given later.

The path information 26 includes a source 261, a target 262, a rewrite bit 263, and a rewrite target 264.

The source 261 includes an IP address 2611 and a port number 2612 for identifying the source of the packet.

The target 262 includes an IP address 2621 and a port number 2622 for identifying the target of the packet.

The rewrite bit 263 is a flag showing whether the target of the packet is to be rewritten for the rewrite target 264 or not. When the rewrite bit 263 is "1", the path switching module 25 judges whether the source and target of the packet coincide with the source 261 and the target 262 or not, and when they coincide, the target of the packet will be rewritten to the rewrite target 264.

The rewrite target 264 includes an IP address 2641 and the port number 2642 identifying the target of the packet after being rewritten.

The packet of read write request issued by the application program 15 includes the IP address "14" (which means the IP interface 14) and the port number "15" (which means the application program 15), as the source, and the IP address "111" (which means the IP interface 111) and the port number "101" (which means the data storage area 101) as the target. Those are consistent with the IP address 2611 and the port number 2612 of the source 261, and the IP address 2612 and the port number 2622 of the target 262. When the rewrite bit is "1", the path switching module 25 of the IP switch 21 rewrites the IP address of the target of the packet and the port number into the IP address 2641 and the port number 2642 of the rewrite target.

Next, explanations will be given to the procedure of the data migration.

The procedure of data migration is basically the same as that of the first embodiment shown in FIG. 8. However, the instruction for the path switching program 50 of the computer 10 is replaced by the instruction for the path switching module 25 of the IP switch 21 in the second embodiment. Hereinafter, only differences from the first embodiment will be explained.

It should be noted that in this embodiment, FIG. 10A shows the content of the path information 26 immediately after the start of the procedure of FIG. 8.

In step 822, the DM program 555 gives the path switching module 25 of the IP switch 21 an instruction to hold "216" as the value of the IP address 2641 of the rewrite target 264 and "201" as the value of the port number 2624. As a result, as shown in FIG. 10B, the path information 26 is updated.

In step 826, the DM program 555 gives the path switching module 25 of the IP switch 21 an instruction to set the rewrite bit to "1". As a result, as shown in FIG. 10C, the path information 26 is updated.

According to the second embodiment, after the completion of data migration, even when the application program 15 of the computer 10 issues a read write request as ever to the data storage area 101, the request is issued to the data storage area 201 by the path switching management module 25 of the IP switch 21.

Next, explanations will be given to a third embodiment while referring to the drawings.

Figure 11:
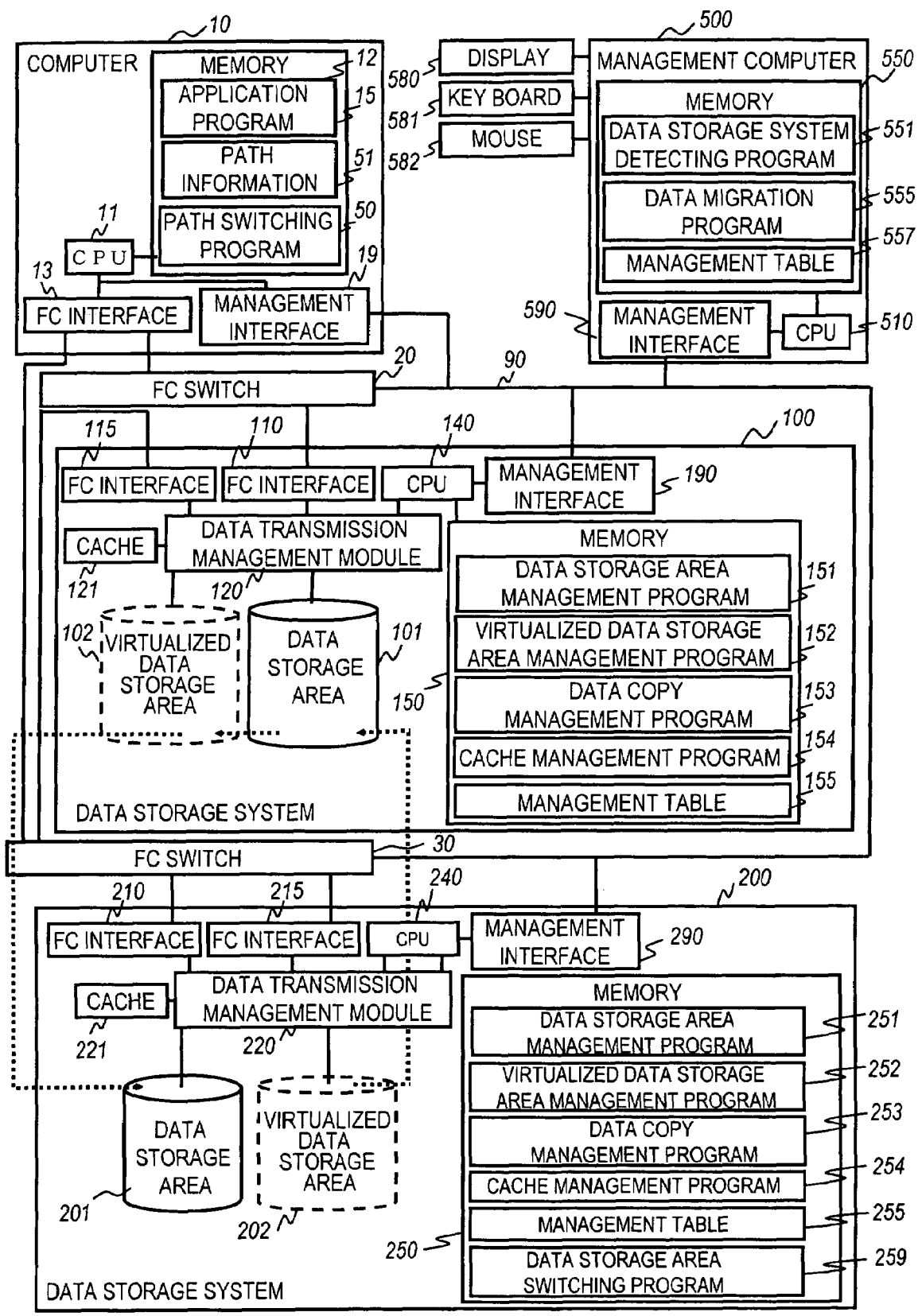
FIG. 11 is a block diagram illustrating a configuration of a computer system according to a third embodiment of this invention.

FIG. 11 is a block diagram illustrating the system configuration according to the third embodiment of this invention.

The configuration of the computer system shown in FIG. 11 according to the third embodiment is basically the same as the computer system shown in FIG. 2 according to the first embodiment. However, the data storage system 200 according to the third embodiment further includes a data storage area switching program 259 and a virtualized data storage area 202. Moreover, as shown in FIGS. 12A to 12C, the management table 557 is stored in the memory 550 of the management computer 500 according to the third embodiment.

In the first embodiment, the data storage system 100 creates the virtualized data storage area 102 corresponding to the data storage area 201 of the data storage system 200. In addition in the third embodiment, the data storage system 200 creates the virtualized data storage area 202 corresponding to the data storage area 101 of the data storage system 100 and copies data.

First, explanations will given to the management table 557.

FIGS. 12A to 12C are each an explanatory diagram of the management table 557 stored in the management computer 500 according to the third embodiment of this invention.

The management table 557 is a table for managing the data migration performed in the computer system according to this embodiment.

FIGS. 12A to 12C show the management table 557 at each time point according to this embodiment. Explanations thereof will be given later.

The management table 557 includes a data storage area number of the data migration source 5571, a virtualized data storage area number 5572, a data storage area number of the data migration destination 5573, and a virtualized data storage area number of the data migration destination 5574. Of those, the data storage area number of the data migration source 5571, the virtualized data storage area number 5572, and the data storage area number of the data migration destination 5573 are the same as the data storage area number of the data migration source 5561, the virtualized data storage area number 5562, and the data storage area number of the data migration destination 5563 of the management table 556 shown in FIGS. 6A and 6B, respectively. In addition, the status shown by FIGS. 12A and 12B are the same as that shown by FIGS. 6A and 6B, respectively. Therefore, explanations thereof will be omitted. It should be noted that the data storage area number (identifier) of the virtualized data storage area 202 is "202".

In the example of FIG. 12C, the data storage area number of the data migration source 5571 is "101", the virtualized data storage area number 5572 is "102", the data storage area number of the data migration destination 5573 is "201", and the virtualized data storage area number of the data migration destination 5574 is "202". This means, as shown in FIG. 11, that the virtualized data storage area 102 corresponding to the data storage area 201 and the virtualized data storage area 202 corresponding to the data storage area 101 are set, and data written into the virtualized data storage area 202 is migrated into the data storage area 201 via the data storage area 101 and the virtualized data storage area 102 (described later).

Next, explanation will be given to the flow of data according to this embodiment.

In the computer system shown in FIG. 11, data written into the data storage area 101 based on the write request from the computer 10 is written into the data storage area 101 and then copied to the virtualized data storage area 102. The write request to the virtualized data storage area 102 is converted into a write request to the data storage area 201 and reissued. As a result, data copied to the virtualized data storage area 102 is written into the data storage area 201.

On the other hand, when a write request is issued from the computer 10 to the virtualized data storage area 202, the request is converted into the write request to the data storage area 101 and reissued. As a result, data is written into the data storage area 101. Data written into the data storage area 101 is copied to the virtualized data storage area 102. The write request to the virtualized data storage area 102 is converted into the write request to the data storage area 201 and reissued. As a result, data copied to the virtualized data storage area 102 is written into the data storage area 201.

In the first embodiment, the path switching is not possible in the computer 10 until the copy operation was completed. Thus, it is required that the path switching program 50 according to the first embodiment correctly recognize the completion of the copy operation. However, in the third embodiment, as shown above, even when the computer 10 issues a write request to the data storage area 101 or to the virtualized data storage area 202, eventually data is always written into the data storage area 201. Thus, the path switching program 50 according to this embodiment can perform path switching at any time regardless of the status of copy of the data storage system.

Hereinafter, explanations will be given to the procedure of data migration of this embodiment while referring to a flow chart of FIG. 13.

Figure 13:
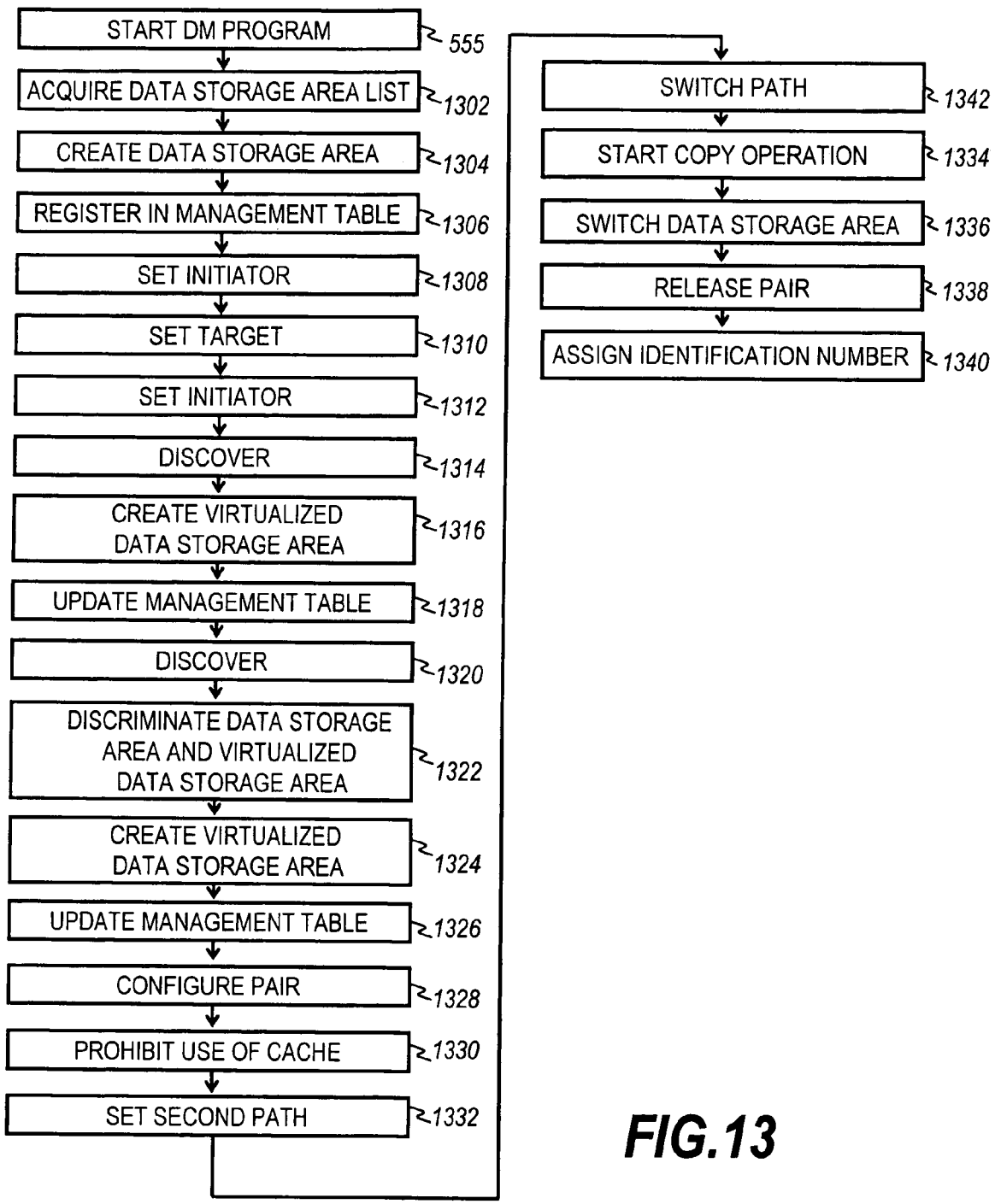
FIG. 13 is a flow chart illustrating a procedure of data migration executed by a data migration program according to the third embodiment of this invention.

FIG. 13 is a flow chart illustrating the procedure of data migration executed by the data migration program 555 according to the third embodiment of this invention.

It should be noted that in FIG. 13, detailed explanations will be omitted regarding procedures similar to the data migration of the first embodiment shown in FIG. 8.

Similarly to the first embodiment, when the execution button 5893 is operated in the confirmation screen 589, the management computer 500 executes the DM program 555.

The DM program 555 first obtains the data storage area list from the data storage system 100 (1302). In this embodiment, the data storage area management program 151 of the data storage system 100 returns the data storage area list shown in FIG. 5 in response to the request from the DM program 555.

Next, the DM program 555 gives the data storage system 200 an instruction to create a data storage area corresponding to the storage capacity of the data storage area 101 (1304). The data storage area management program 251 creates the data storage area 201 (FIG. 11) and notifies the DM program 555 of the creation.

The DM program 555 registers in the management table 557 that the data storage area 201 corresponding to the data storage area 101 has been created (1306). FIG. 12A shows the content of the management table 557 at this time point.

Next, the DM program 555 sets the FC interface 115 of the data storage system 100 as the initiator (1308). Then, the DM program 555 sets the FC interface 210 of the data storage system 200 as the target (1310).

Further, the DM program 555 sets the FC interface 215 as the initiator (1312). As a result, the data storage system 200 becomes ready to issue a read write request to the data storage system 100 via the FC interface 215.

Next, the DM program 555 gives the virtualized data storage area management program 152 an instruction to discover a data storage area via the FC interface 115, which is set as the initiator (1314). Herein, the data storage area 201 is discovered. The virtualized data storage management program 152 notifies the DM program 555 that the data storage area 201 has been discovered.

Next, the DM program 555 gives the virtualized data storage area management program 152 an instruction to create a virtualized data storage area corresponding to the data storage area 201 (1316). As shown in FIG. 11, the virtualized data storage management program 152 creates the virtualized data storage area 102. The virtualized data storage management program 152 notifies the DM program 555 that the virtualized data storage area 102 corresponding to the data storage area 201 has been created.

Then, the DM program 555 updates the management table 557 (1318). FIG. 12B shows the content of the updated management table 557.

Next, the DM program 555 gives the virtualized data storage area management program 252 an instruction to discover a data storage area via the FC interface 225, which is set as the initiator (1320). Herein, the data storage area 101 and the virtualized data storage area 102 are discovered. The virtualized data storage management program 252 notifies the DM program 555 that the data storage area 101 and the virtualized data storage area 102 have been discovered.

Then, the DM program 555 discriminates whether the discovered area is a data storage area or virtualized data storage area while referring to the management table 557 (1322). As shown in FIG. 12B, the discovered data storage area 101 is a general data storage area (not a virtualized data storage area).

Next, the DM program 555 gives the virtualized data storage area management program 252 an instruction to create a virtualized data storage area corresponding to the data storage area 101 (1324). As shown in FIG. 11, the virtualized data storage area management program 252 creates the virtualized data storage area 202. The virtualized data storage management program 252 notifies the DM program 555 that a virtualized data storage area 202 corresponding to the data storage area 101 has been created.

Then, the DM program 555 updates the management table 557 (1326). FIG. 12C shows the content of the updated management table 557.

Next, the DM program 555 gives the data copy management program 153 an instruction to configure a pair, in which the data storage area 101 is a source and the virtualized data storage area 102 being a destination (1328). As shown in FIG. 7A, the data copy management program 153 registers the pair configuration in the management table 155.

Next, the DM program 555 gives the cache management program 154 an instruction to prohibit the use of cache 121 with regard to the data storage area 101 (1330). The cache management program 154 writes all the data concerning the data storage area 101 remaining in the cache 121 to the data storage area 101, and enables a setting to prohibit the use of the cache 121 after that.

Then, the DM program 555 gives the path switching program 50 of the computer 10 an instruction to register the data storage area 202 as the second path related to the data storage area 101 (1332). As a result, as shown in FIG. 3D, the path information 51 is updated.

Unlike the first embodiment, the path switching program 50 can switch the path at an arbitrary timing after the second path is set in the path information 51. In FIG. 13, for the sake of simplicity, a procedure is shown, in which the path switching is performed (1342) after setting the second path (1332) and before starting the copy operation (1334). However, the path switching program 50 can perform the path switching, after starting copy operation, either before or after its completion. Alternatively, it is allowable to perform the path switching after switching the data storage area (1336) (described later). The path switching program 50 may switch the path, for example, based on to the operating status of the application program 15. The procedure for the path switching is the same as step 826 of FIG. 8 according to the first embodiment.

Next, the DM program 555 gives the data copy management program 153 an instruction to start the copy operation (1334). When the copy operation is completed, the data copy management program 153 notifies the DM program 555 to that effect.

Then, the DM program 555 gives the data storage area switching program 259 of the data storage system 200 an instruction to change the data storage area number (identifier) of the data storage area 201 from "201" to "202" (1336). Thereafter, the data management module 220 of the data storage system 200 handles the data storage area 201 as a data storage area whose data storage area number is "202". As a result, in response to the write request issued from the computer to the virtualized data storage area 202, data is written into the data storage area 201. On the other hand, for the virtualized data storage area 202, for the moment, "NULL" is given as a data storage area number. "NULL" means that the virtualized data storage area is not available for the computer 10.

When receiving a notification that the path has been switched from the path switching program 50 of the computer 10, the DM program 555 gives the data copy management program 153 an instruction to release the pair relation between the data storage area 101 and the virtualized data storage area 201 (1338). However, when the path is switched before the completion of the data copy operation, the DM program 555 gives an instruction to release the pair relation after the completion of data copy operation.

Next, the DM program 555 gives the data storage area switching program 259 an instruction to give a new data storage area number to the virtualized data storage area 202, which has been given "NULL" as the data storage area number (1340). The data storage area switching program 259 gives, for example, the virtualized data storage area 202 an unused data storage area number "203". As a result, the computer 10 can be use the virtualized data storage area 202 as a data storage area whose data storage area number is "203". In other words, the data storage system 200 uses the data storage area number "203" to receive a write or read request from the computer 10. Those requests are processed as requests to the virtualized data storage area 202 in the data storage system 200. At this time, an actual data storage area corresponding to the virtualized data storage system 202 is the data storage area 101 of the data storage system 100.

According to the third embodiment of this invention, the path switching can be performed at an arbitrary timing, while in the first embodiment, the path switching program 50 cannot switch the path before the completion of the copy operation. Moreover, the data storage system 200 provides the virtualized data storage system 202 with a new data storage area number, thereby allowing the data storage area 101 to be reused as a data storage area of the data storage system 200. Accordingly, after data migration, even the storage system whose device life is about to expire, can continue to be used until immediately before reaching the device life, and therefore, the data storage device can be effectively utilized. It is desirable that such a data storage area be used temporarily.

According to the above-mentioned embodiments, in the computer system including a computer, in which an old data storage system can be connected via a network to both the computer and a new storage system, data migration can be performed without interrupting the access from the computer to the data storage system. According to the above-mentioned embodiments, regardless of the timing of the completion of data migration in the data storage system, path switching in the computer can be performed. According to the above-mentioned embodiments, after the completion of data migration, the computer continuously uses the old data storage system via a new data storage system, thereby realizing an effective utilization of the data storage area.

What is claimed is:

1. A computer system, comprising:
 a computer;
 a plurality of data storage systems coupled to the computer via a FC switch and including a first data storage system and a second data storage system; and
 a management computer for managing the computer and the plurality of data storage systems,
 wherein the first data storage system includes:
 a first FC interface;
 a second FC interface;
 a first CPU;
 a first memory;
 a first management interface;
 a first cache;
 a first data transmission module;
 a first data storage area management module, a first virtualized data storage area management module, a first data copy management module, and a first cache management module, which are realized when the first CPU executes a program stored in the first memory; and
 a first data storage area for storing data written by the computer;
 wherein the second data storage system includes:
 a third FC interface;
 a fourth FC interface;
 a second CPU;
 a second memory;
 a second management interface;
 a second cache;
 a second data transmission module;
 a second data storage area management module, a second virtualized data storage area management module, a second data copy management module, a second cache management module, and a data storage area switching module, which are realized when the second CPU executes a program stored in the second memory; and
 a second data storage area to which data of the first data storage area migrates;
 wherein the computer includes:
 a fifth FC interface;
 a third management interface;
 a third CPU;
 a third memory; and
 an application module and a path switching module, which are realized when the third CPU executes a program stored in the third memory;
 wherein the management computer includes:
 a fourth management interface;
 a fourth CPU;
 a fourth memory; and
 a data storage system detecting module and a data migration module, which are realized when the fourth CPU executes a program stored in the fourth memory,
 wherein the data migration module gives the first virtualized data storage area management module an instruction to create a first virtualized data storage area corresponding to the second data storage area, in the first data storage system,
 wherein the first virtualized data storage area management module converts a write request for data issued to the first virtualized data storage area into a write request to the second data storage area and issues the write request, wherein the data migration module gives the first data copy management module an instruction to copy the data stored in the first data storage area to the first virtualized data storage area, wherein the first data copy management module issues a write request for copying the data stored in the first data storage area to the first virtualized data storage area, wherein the data migration module gives the second virtualized data storage area management module an instruction to create a second virtualized data storage area, corresponding to the first data storage area, in the second data storage system, wherein the second virtualized data storage area management module converts a write request for data issued to the second virtualized data storage area into a write request to the first data storage area and issues the write request, wherein the data migration module gives the data storage area switching module an instruction to change an object, to which the computer issues a data write request, from the first data storage area to the second virtualized data storage area, wherein the data migration module gives the data storage area switching module an instruction to change an identifier of the second data storage area into an identifier of the second virtualized data storage area after completion of a copy operation, wherein the data migration module gives the data storage area switching module instructions to change the identifier of the second virtualized data storage area after the identifier of the second data storage area is changed into the identifier of the second virtualized data storage area and after the path switching module changes an object for writing the data from the first data storage area to the second virtualized data storage area, and wherein the data migration module gives the first cache management module an instruction to write data, which are stored in the first cache and to be written into the first data storage area, in the first data storage area before the copy operation is instructed, and after the copy operation is started, gives the first cache management module an instruction to prohibit writing of the data to be written in the first data storage area into the first cache.

2. A computer system, comprising:

a computer; and a plurality of data storage systems coupled to the computer and including a first data storage system and a second data storage system, wherein the first data storage system includes:

a virtualized data storage area management module;

a data copy management module; and a first data storage area for storing data written by the computer;

the second data storage system includes a second data storage area, into which data stored in the first data storage area migrates;

the virtualized data storage area management module creates a virtualized data storage area corresponding to the second data storage area in the first data storage system;

the virtualized data storage area management module converts a write request for data issued to the virtualized data storage area into a write request to the second data storage area and issues the write request;

the data copy management module issues a write request for copying the data stored in the first data storage area into the virtualized data storage area;

the computer includes a path switching module; and the path switching module switches an object, to which the computer issues a data write request, from the first data storage area to the second data storage area after completion of a copy operation.

3. The computer system according to claim 2, wherein the first data storage system further includes:

a first interface coupled to the computer; and a second interface coupled to the second data storage system;

the first data storage system sets the second interface to issue at least one of a write request and a read request to the second data storage system;

after the completion of the copy operation, the first data storage system sets the second interface to receive at least one of a write request and a read request from the second data storage system;

wherein the second data storage system further includes:

a third interface coupled to the computer; and a fourth interface coupled to the first data storage system;

the second data storage system sets the fourth interface to receive at least one of a write request and a read request from the first data storage system; and after the completion of the copy operation, the second data storage system sets the fourth interface to issue at least one of a write request and a read request to the first data storage system.

4. The computer system according to claim 2, wherein the first data storage system further includes:

a cache for temporarily storing data to be written into the first data storage area; and a cache management module for managing the cache;

the cache management module writes data, which are stored in the cache and to be written into the first data storage area, into the first data storage area before starting the copy operation; and the cache management module prohibits writing of data to be written into the first data storage area into the cache after starting the copy operation.

5. A computer system, comprising:

a computer; and a plurality of data storage systems coupled to the computer via a network and including a first data storage system and a second data storage system, wherein the first data storage system includes:

a first interface coupled to the network;

a first processor coupled to the first interface;

a first memory coupled to the first processor; and a first data storage area for storing data written by the computer;

wherein the second data storage system includes:

a second interface coupled to the network;

a second processor coupled to the second interface;

a second memory coupled to the second processor; and a second data storage area, into which data stored in the first data storage area migrates;

the first processor creates a first virtualized data storage area corresponding to the second data storage area in the first data storage system;

the first processor converts a write request for data issued to the first virtualized data storage area into a write request to the second data storage area and issues the write request;

the first processor issues a write request for copying the data stored in the first data storage area to the first virtualized data storage area;

the second processor creates a second virtualized data storage area corresponding to the first data storage area in the second data storage system; and the second processor converts a write request for data issued to the second virtualized data storage area into a write request to the first data storage area and issues the write request.

6. The computer system according to claim 5, wherein the computer includes:

a third interface coupled to the network;
a third processor coupled to the third interface; and
a third memory coupled to the third processor;
the third processor switches the object, to which the computer issues a write request, from the first data storage area to the second virtualized data storage area; and
the second processor changes an identifier of the second data storage area into an identifier of the second virtualized data storage area after the completion of the copy operation.

7. The computer system according to claim 6, wherein the second processor changes the identifier of the second virtualized data storage area after the second processor changes the identifier of the second data storage area into the identifier of the second virtualized data storage area and after the third processor switches the object, to which a data write request is issued, from the first data storage area to the second virtualized data storage area, and wherein the second data storage system receives at least one of a write request and a read request for data issued to the second virtualized data storage area from the computer by using the changed identifier.

8. The computer system according to claim 5, wherein the first data storage system further includes:

a cache for temporarily storing data written into the first data storage area, and
wherein the first processor writes data, which are stored in the cache and to be written into the first data storage area, into the first data storage area before starting the copy operation, and prohibits writing of data to be written into the first data storage area into the cache after starting the copy operation.

9. A management computer coupled via a management network to a computer system that includes a computer and a plurality of data storage systems coupled to the computer via a network and including a first data storage system and a second data storage system, comprising:

a management interface coupled to the management network;
a first processor coupled to the management interface; and
a first memory coupled to the first processor,
wherein a first data storage system includes a first data storage area for storing data written by the computer,
wherein the first processor acquires an identifier of the first data storage area provided by the first data storage system from the first data storage system via the management interface,
wherein the first processor registers the acquired identifier of the first data storage area in the first memory,
wherein the first processor sends to a second data storage system an instruction via the management interface to create a second data storage area, into which data stored in the first data storage area migrates,
wherein the first processor registers the identifier of the created second data storage area in the first memory in correspondence with the identifier of the first data storage area,
wherein the first processor sends to the first data storage system an instruction via the management interface to create a first virtualized data storage area corresponding to the second data storage area, wherein the first processor registers the identifier of the created first virtualized data storage area in the first memory in correspondence with the identifier of the first data storage area and the second data storage area, and wherein the first processor refers to the identifier registered in the first memory to send to the first data storage system via the management interface an instruction to copy the data stored in the first data storage area to the virtualized first data storage area.

10. The management computer according to claim 9, wherein the first data storage system includes:

a first interface coupled to the computer via the network; and
a second interface coupled to the second data storage system;
the first processor sends to the first data storage system via the management interface an instruction to set the second interface to issue at least one of a write request and a read request to the second data storage system;
after completion of a copy operation, the first processor sends to the first data storage system via the management interface an instruction to set the second interface to receive at least one of a write request and a read request from the second data, storage system;
wherein the second data storage system includes:
a third interface coupled to the computer; and
a fourth interface coupled to the first data storage system;
the first processor sends to the second data storage system via the management interface an instruction to set the fourth interface to receive at least one of a write request and a read request from the first data storage system;
after the completion of the copy operation, the first processor sends to the second data storage system via the management interface an instruction to set the fourth interface to issue at least one of a write request and a read request to the first data storage system; and
after the completion of the copy operation the first processor refers to the identifier registered in the first memory to send to the computer via the management interface an instruction to switch an object, to which a data write request is issued, from the first data storage area to the second data storage area.

11. The management computer according to claim 9, wherein the first data storage system includes a cache for temporarily storing data to be written into the first data storage area, wherein the first processor sends to the first data storage system via the management interface an instruction to write data, which is stored in the cache and to be written in the first data storage area, to the first data storage area before instructing a copy operation, and wherein the first processor sends to the first data storage system via the management interface an instruction to prohibit writing of data to be written into the first data storage area into the cache after starting the copy operation.

12. The management computer according to claim 9, wherein the first processor sends to the second data storage system via the management interface an instruction to create a second virtualized data storage area corresponding to the first data storage area,
wherein the first processor registers the identifier of the created second virtualized data storage area in the first memory in correspondence with the identifier of the first data storage area, the identifier of the first virtualized data storage area, and the identifier of the second data storage area, wherein the first processor refers to the identifier registered in the first memory to send the computer via the management interface an instruction to switch an object, to which a data write request is issued, from the first data storage area to the second virtualized data storage area; and after completion of a copy operation, the first processor sends to the second data storage system via the management interface an instruction to change the identifier of the second data storage area into the identifier of the second virtualized data storage area.

13. The management computer according to claim 12, wherein the first processor sends to the second data storage system, via the management interface, an instruction to change the identifier of the second virtualized data storage area, after the second data storage system changes the identifier of the second data storage system, into the identifier of the second virtualized data storage area and after the computer switches the object, to which a data write request is issued, from the first data storage area to the second virtualized data storage area.

14. The management computer according to claim 12, wherein the first data storage system includes a cache for temporarily storing data to be written into the first data storage area,
wherein the first processor sends to the first data storage system via the management interface an instruction to write data, which is stored in the cache and to be written in the first data storage area, to the first data storage area before instructing the copy operation, and
wherein the first processor sends to the first data storage system via the management interface an instruction to prohibit writing of data to be written into the first data storage area into the cache after starting the copy operation.

15. A management method for a computer system that includes:
a computer and a plurality of data storage systems coupled to the computer and including a first data storage system and a second data storage system,
wherein the first data storage system including a first data storage area for storing data written by the computer,
wherein the second data storage system including a second data storage area, into which data in the first data storage area migrates,
wherein the management method comprising:
creating a first virtualized data storage area corresponding with the second data storage area in the first data storage system;
converting a write request for data issued to the first virtualized data storage area into a write request to the second data storage area and issuing the write request; and
issuing a write request for copying the data stored in the first data storage area to the first virtualized data storage area,
wherein the first data storage system includes:
a first interface coupled to the computer,
a second interface coupled to the second data storage system, and
a cache for temporarily storing data to be written into the first data storage area,
wherein the second data storage system includes:
a third interface coupled to the computer, and
a fourth interface coupled to the first data storage system,
wherein the management method further comprising:
setting the second interface to issue at least one of a write request and a read request to the second data storage system,
setting the fourth interface to receive at least one of a write request and a read request from the first data storage system,
after completion of a copy operation, setting the second interface to receive at least one of a write request and a read request from the second data storage system,
after the completion of the copy operation, setting the fourth interface to issue at least one of a write request and a read request to the first data storage system,
before starting the copy operation, writing data, which is stored in the cache and to be written into the first data storage area, into the first data storage area, and
after the completion of the copy operation, switching an object, to which the computer issues a data write request, from the first data storage area to the second data storage area.

16. A management method for a computer system that includes:
a computer and a plurality of data storage systems coupled to the Computer and including a first data storage system and a second data storage system,
wherein the first data storage system including a first data storage area for storing data written by the computer,
wherein the second data storage system including a second data storage area, into which data in the first data storage area migrates,
wherein the management method comprising:
creating a first virtualized data storage area corresponding with the second data storage area in the first data storage system;
converting a write request for data issued to the first virtualized data storage area into a write request to the second data storage area and issuing the write request, and
issuing a write request for copying the data stored in the first data storage area to the first virtualized data storage area,
wherein the first data storage system includes a cache for temporarily storing data to be stored in the first data storage area,
wherein the management method further comprising:
creating a second virtualized data storage area corresponding to the first data storage area in the second data storage system;
converting a write request for data issued to the second virtualized data storage area into a write request to the first data storage area and issuing the write request;
before starting the copy operation, writing data, which is stored in the cache and to be written into the first data storage area, into the first data storage area;
switches an object, to which the computer issues a data write request, from the first data storage area to the second virtualized data storage area;
after the completion of the copy operation, changing an identifier of the second data storage area into an identifier of the second virtualized data storage area;
after changing the identifier of the second data storage area into the identifier of the virtualized data storage area and after changing the object, to which the data write request is issued, from the first data storage area to the second virtualized data storage area, changing the identifier of the second virtualized data storage area; and
receiving at least one of a write request and a read request for data to the second virtualized data storage area from the computer by using the changed identifier.

* * * * *